July 2, 1957  G. B. EICHELHARDT  2,797,422
SYNTHETIC COATED WIRE STRIPPER
Filed Dec. 29, 1954  4 Sheets-Sheet 2

INVENTOR.
GUSTAVE B. EICHELHARDT
BY Kenyon & Kenyon

ATTORNEYS.

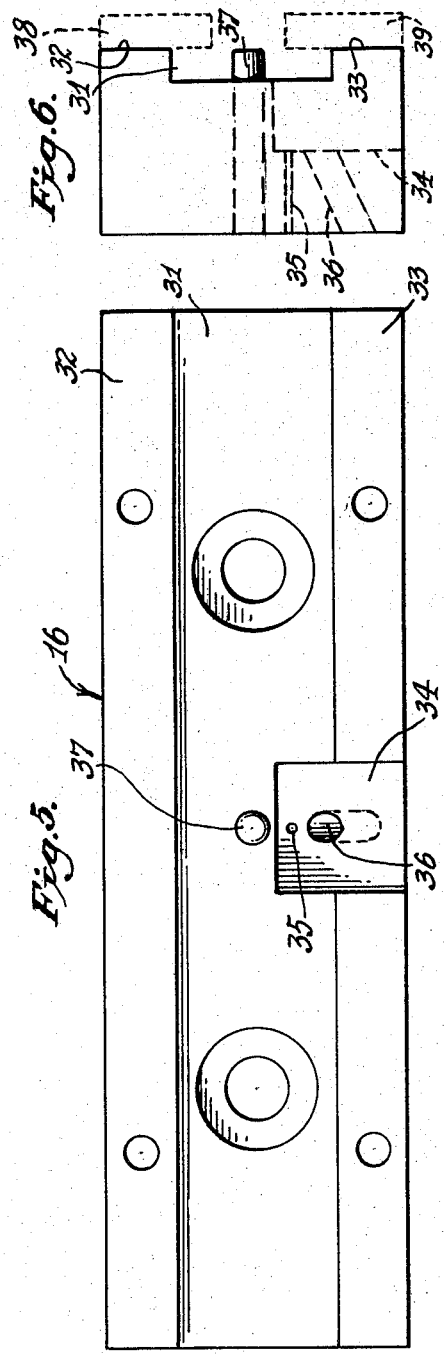

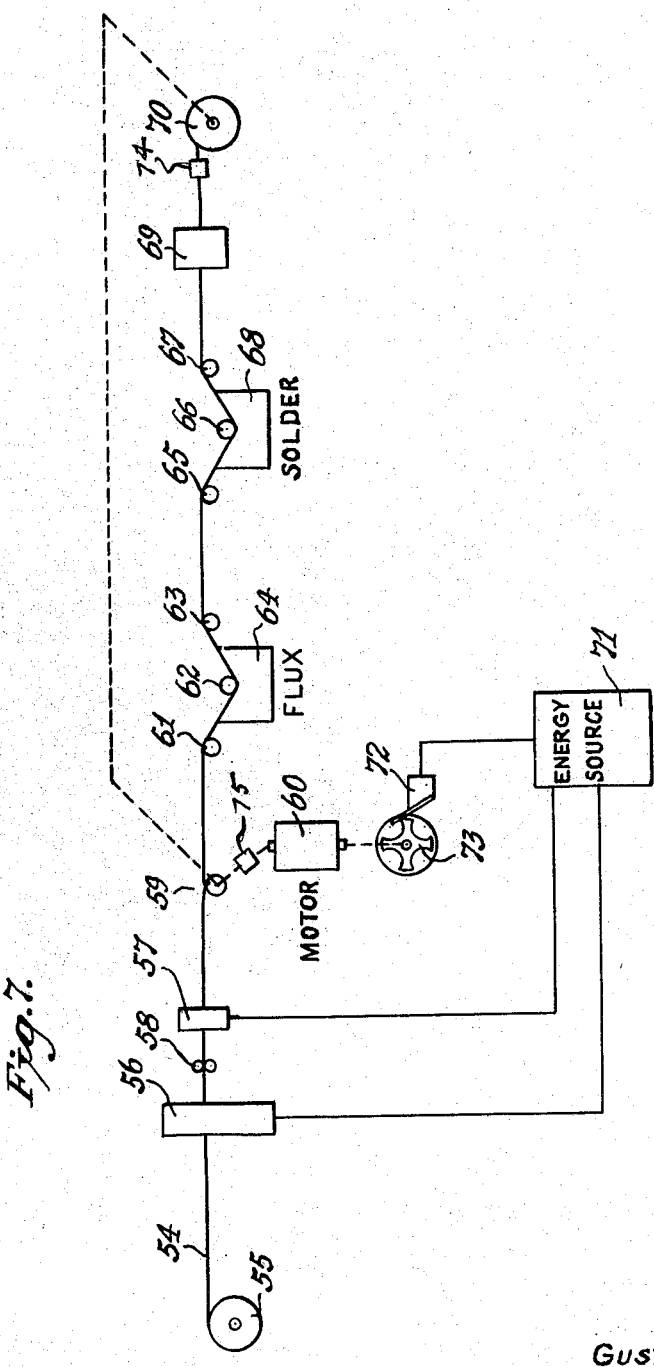

2,797,422
SYNTHETIC COATED WIRE STRIPPER

Gustave B. Eichelhardt, Chatham, N. J.

Application December 29, 1954, Serial No. 478,279

8 Claims. (Cl. 15—93)

This invention relates to apparatus for stripping insulation from wire and more particularly to a stripper adapted intermittently to remove sections of plastic or synthetic insulation from a wire which is fed continuously therethrough.

In the winding of electrical inductors, transformers and the like, it is the modern practice to make use of a conductive wire having an outer insulation in the form of a synthetic or plastic film constituted, for example, by a polyvinyl acetal resin known under the trade name of Formex, or by silicone or polymetric materials. Such insulation layers are strong, flexible and abrasion resistant, and possess excellent dielectric properties. However, the adherence of the insulation to the wire is so effective as to render the removal thereof a very difficult and time consuming task.

In the electronics industry, the removal of insulation from wires is a serious operational factor in production where in order to expedite output the insulation must be removed quickly and efficiently. The problems involved are further magnified where the wire to be stripped is of fine gauge or where only predetermined sections of the wire are to be stripped. Thus, in the making of multi-tapped coils, the wire forming the helix must be bared at a plurality of spaced points. Moreover, it is not sufficient merely to strip the insulation from the wire, but it is also essential to remove the resultant flakes or particles of insulation therefrom to afford a clean soldering surface.

Accordingly, it is the primary object of the present invention to provide a stripping apparatus for stripping retentive synthetic or plastic insulation layers from wire rapidly and efficiently.

More particularly, it is an object of the invention to provide a stripping machine wherein a wire is passed continuously through a stripper-mechanism adapted intermittently to strip the insulation therefrom.

Still another object of the invention is to provide a stripping machine of the character described wherein the stripper-mechanism is actuated automatically at predetermined intervals as the wire is drawn continuously therethrough.

Yet another object of the invention is to provide a stripper-mechanism through which wire may be continuously drawn, which mechanism is adjustable to strip any desired length of insulation wire. A feature of the invention resides in the fact that the cutting blades of the stripper-mechanism are actuatable by electrical solenoids and are designed accurately to strip particular gauges of wire without unduly scraping the wire.

It is also an object of the invention to provide a stripping mechanism having air-jet means for removing residual insulation flakes or dirt particles.

Also an object of the invention is to provide a stripper-mechanism whose intermittent operation is synchronized with the passage of wire therethrough.

It is a still further object of the invention to provide a stripper-mechanism which is of compact, sturdy and reliable design and which may be inexpensively manufactured.

For a better understanding of the invention as well as further objects and additional features thereof, reference is made to the following detailed description to be read in conjunction with the accompanying drawing wherein like elements in the several views are identified by like reference numerals.

In the drawing:

Fig. 3 is a plan view solely of the stripping blades employed in the mechanism.

Fig. 4 is a side view of one of said blades.

Fig. 5 is a plan view of the guide block for the blades.

Fig. 6 is a side view of said guide block.

Fig. 7 is a schematic diagram of a stripping and soldering assembly in accordance with the invention.

Figure 1:
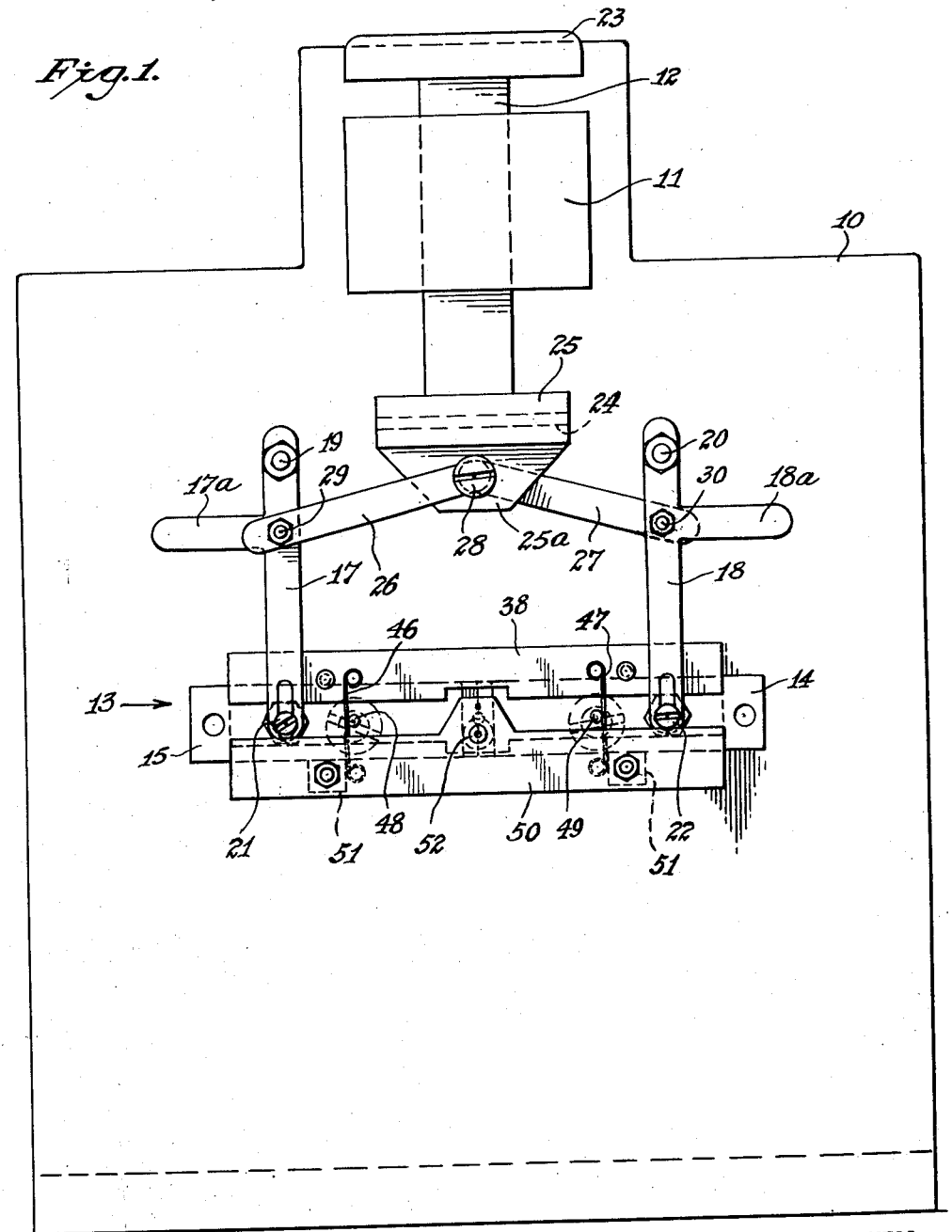
Fig. 1 is a front elevational view of a stripper-mechanism in accordance with the invention.
Figure 2:
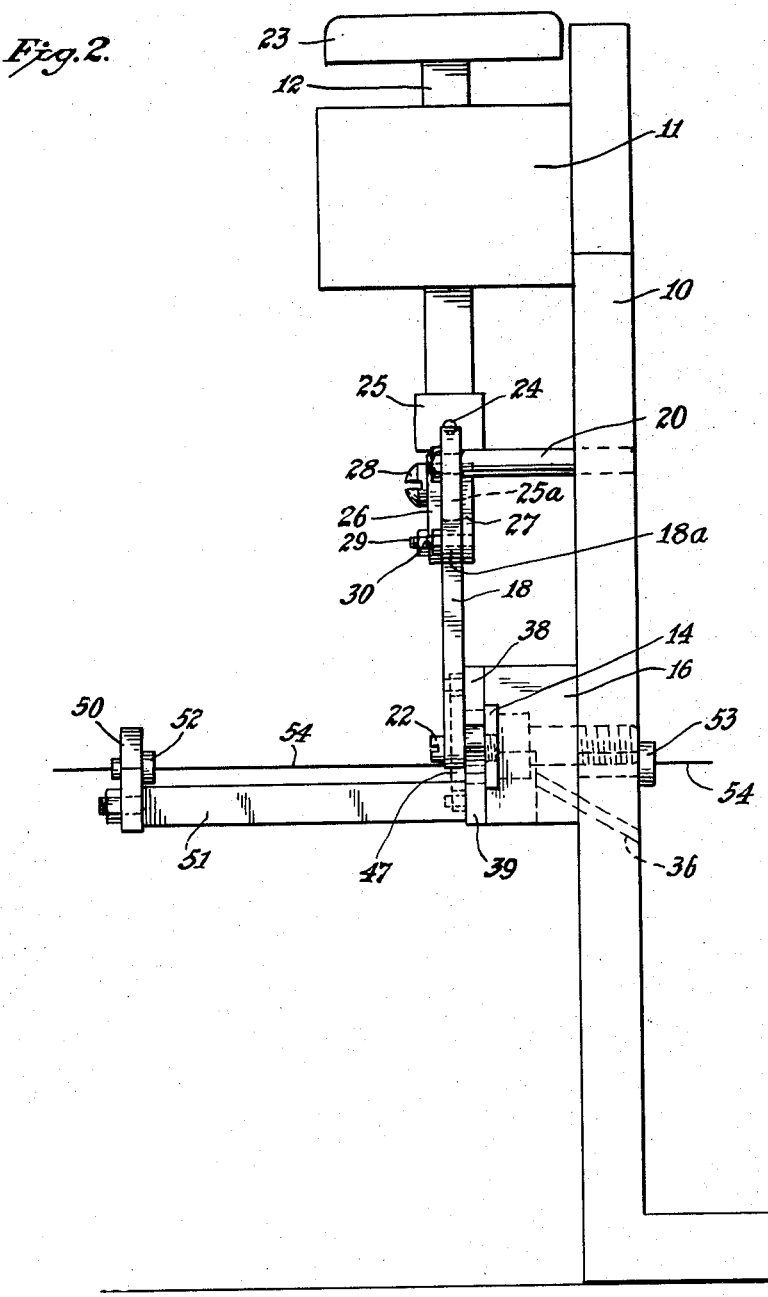
Fig. 2 is a side elevational view of said mechanism.

Referring now to the drawing and more particularly to Figs. 1 and 2, a stripper-mechanism in accordance with the invention comprises an angle plate 10, vertically supporting an electromagnet solenoid 11 having a magnetic plunger 12 slidable therein.

Mounted on plate 10 below solenoid 11 is a stripper assembly, generally designated by numeral 13, comprising a pair of complementary blades 14 and 15 reciprocable within a guide block 16 formed of hardened tool steel. Electromagnetic actuation of the blades is accomplished by means of a pair of rocker arms 17 and 18 having lateral balancing extensions 17a and 18a, respectively. The upper ends of rocker arms 17 and 18 are pivotally connected to posts 19 and 20 attached to angle plate 10, while the lower ends of said arms are pivotally connected to posts 21 and 22 projecting from blades 14 and 15. Thus a swinging movement of the rocker arms 17 and 18 about pivot points 19 and 20 effects a reciprocating movement of the blades in opposing directions, such that the cutting edges of the blades are either brought together or withdrawn.

The upper end of plunger 12 is terminated in a cap 23 which serves to limit the downward movement of the plunger. The lower end of plunger 12 is connected by a pin 24 to a link head 25, having a trapezoidal connector piece 25a. Head 25 is operatively coupled to rocker arms 17 and 18 by means of oppositely directed link bars 26 and 27, the bars each being pivotally connected at one end to piece 25a by a screw 28. The other end of bar 26 is pivotally connected to rocker arm 17 by screw 29 adjacent extension 17a, while the other end of bar 27 is pivotally connected to rocker arm 18 by screw 30 adjacent 18a. Thus the downward movement of plunger 12 causes the rocker arms 17 and 18 to swing outwardly while an upward movement of the plunger causes the rocker arms to swing inwardly.

As shown in Figs. 5 and 6 guide block 16 has formed therein a longitudinal groove 31 defining parallel ridges 32 and 33 to constitute a slideway for the stripper blades 14 and 15. A rectangular recess 34 is cut into the block at the midpoint thereof, the recess extending from one side of the block to a point adjacent the longitudinal axis thereof. Drilled through the block and extending from the back face thereof to the bottom surface of the recess is a small bore 35 which runs parallel to the sides of the block, the bore being dimensioned to accommodate wire to be stripped. A larger bore 36 is drilled through the block at an angle to the sides thereof, the bore extending from the back face of the block to the bottom surface of the recess. The opening of bore 36 is adjacent the smaller bore 35, bore 36 acting as an air duct for supplying an air jet to clean the stripped surface of the wire passing through bore 35 and to clean the working edges of blades 14 and 15. At the center of block 16 is mounted a peg 37, serving as a guide post for the blades 14 and 15. Secured to the ridges 32 and 33 and overlapping the groove 31 are guide bars 38 and 39, shown in dotted lines in Fig. 6, which in cooperation with the groove form a channel for the blades 14 and 15.

As best seen in Figs. 3 and 4, the blades 14 and 15 are constituted by rectangular strips preferably formed of carbide or carboloy tipped tool steel, the blades having complementary, chamfered cutting edges 14a and 15a, respectively. Formed in the center of cutting edges 14a and 15a are arcuate notches 40 and 41, which notches when the blades are brought together surround the guide peg 37 on the guide block and define a perfect circle thereabout. Thus the notches 40 and 41 act to align the blades in their operative position.

Also formed in blades 14 and 15 to one side of the guide notches are notches 42 and 43, respectively, having a cutting surface. Notches 42 and 43 when the blades are in engagement surround the wire passing through bore 35 in the guide block and act to scrape the insulation therefrom. The notches 42 and 43 are dimensioned to bare the insulation of a wire having a predetermined gauge. In order to use the same blades for wire of a different gauge, a second pair of cutting notches 44 and 45 is provided on the other side of the guide notches, the notches 44 and 45 being brought into operative position with the wire bore 35 by reversing the position of the blades 14 and 15.

Blades 14 and 15 are normally urged into engagement by means of a pair of flat springs 46 and 47 which extend between the guide bars 38 and 39 and are fastened thereto. Abutting springs 46 and 47 are pegs 48 and 49 projecting from blades 15 and 14, respectively, the tension of the springs and the position of the pegs being such as to bring the blades together with sufficient pressure to effect a stripping action on the wire passing through the blades.

To maintain the wire in a straight line as it passes through the stripper assembly, as best seen in Fig. 2, a guide plate 50 is provided, the plate being mounted on extension arms 51 and having a bushing 52 in alignment with the opening of bore 35 on the front face of guide block 16. A second bushing 53 is provided in the angle plate 10 in alignment with the opening of bore 35 in the rear face of the guide block. Thus the wire 54 to be stripped first passes through the bushing 53 and then through bore 35, the wire being engaged by the notches in the cutting blades 14 and 15 and being removed through bushing 52, which also tends to scrape off chips not blown off by the air jet.

In operation, when solenoid 11 is energized, plunger 12 is displaced downwardly, thereby causing links 26 and 27 to swing rocker arms 17 and 18 outwardly against the pressure of springs 46 and 47 and to disengage the blades 14 and 15. Thus in the energized condition of the solenoid, the blades are withdrawn from the wire, whereas when the solenoid is de-energized the blades come together to effect a stripping action. Obviously, the mechanical arrangement may be made such as to reverse the action of the solenoid that when the solenoid is energized the blades are drawn together.

It is to be understood that while the blades urged together by flat springs in the stripper embodiment disclosed herein, the arrangement alternatively may be such as to employ helical springs bearing against the ends of the blades, the structure otherwise being identical with that shown.

Referring now to the layout of the production stripping machine shown in Fig. 7, the raw insulated wire 54 is wound on a reel 55. The wire taken from the reel is fed successively through a first stripper-mechanism 56, of the type disclosed in Figs. 1 to 6, which is mounted horizontally, and a second stripper-mechanism 57 mounted vertically, a pair of guide rollers 58 being interposed between the mechanisms.

The wire is drawn through the stripper-mechanisms by means of a mandrel 59 having a variable pulling speed and driven by a suitable motor 60. Thereafter the wire is conveyed by means of pulleys 61, 62 and 63 through a flux bath 64 to coat the wire with a layer of flux material prior to soldering. The flux coated wire is then conveyed by pulleys 65, 66 and 67 through a molten solder bath 68 in which the stripped sections of the wire are tinned. Finally the wire passes through a wiper 69 which serves to remove excess solder while it is still hot and onto a take-up reel 70 which is ganged and synchronized with the pulling mandrel 59. Interposed between wiper 69 and take-up reel 70 is a transverse mechanism 74 to rewind the wire in a suitable manner.

In order to actuate the stripper-mechanisms 56 and 57 so as to bare predetermined stretches of the wire, the energization source 71 for the control solenoids of the mechanisms is governed by a control switch 72 which is operatively coupled to a cam 73 connected to the shaft of a variable speed reducer 75 which is driven by motor 60 and is adapted to activate the energization source by the predetermined shape of the cam.

Let us assume, by way of example, that the wire is to be stripped every two feet along its length for a stretch of one inch. A wire of this type may be desired for purposes of making a multi-tapped coil. With this in mind, the first and second stripper-mechanisms are separated at a distance of two feet, or alternatively the wire between the mechanisms may be fed through a roller path extending two feet in overall length. The cam switching system is adjusted so that after the wire has been drawn two feet by mandrel 59, the stripping mechanisms are actuated and remain actuated for an interval sufficient only to strip one inch of insulation.

The first mechanism 56, which is horizontally disposed operates upon the wire so as to strip insulations from opposed halves thereof on either side of the vertical axis thereof. In order to ensure a thorough stripping of the wire, the wire stretch which was stripped by the first mechanism is fed through the vertically mounted second mechanisms which functions to strip insulation from opposed halves of the same stretch of wire on either side of the horizontal axis thereof.

It is to be understood that while the stripper has been disclosed in connection with round wire, it is also operative for the stripping of square wire, in which case the blades are provided with rectangular edges.

Concurrently with the operation of the stripping mechanisms, air pressure means of any suitable design may be actuated to provide a jet of air along the wire in the region of the blades to blow off residual particles of insulation from the wire prior to insertion thereof in the flux bath. For this purpose the air pressure means may include electromagnetically operated valves operating simultaneously with the solenoids of the stripper-mechanism.

While there has been shown what is considered to be a preferred embodiment of the invention, it will be manifest that many changes and modifications may be made therein without departing from the essential spirit thereof. It is intended therefore to cover in the annexed claims all such changes as fall within the true scope of the invention.

What is claimed is:

1. Apparatus for stripping plastic bonded insulation or the like from the surface of a wire comprising a pair of oppositely reciprocable blades having complementary cutting edges, and a guide block having a channel formed therein for supporting said blades in co-planar relation, said blade edges having a pair of complementary cutting notches formed therein to accommodate a wire, said block having a bore therein perpendicularly disposed relative to said channel and in registration with said notches whereby when said wire is pulled through said bore said blades effect a stripping action.

2. Apparatus as set forth in claim 1 wherein said block includes an additional bore constituting an air duct for applying a jet of air to the stripped wire.

3. Apparatus for stripping plastic bonded insulation or the like from the surface of a wire comprising a pair of reciprocable blades having complementary cutting edges, a guide block having a channel for supporting said blades in co-planar relation, said blade edges at the center thereof having a pair of complementary semi-circular guide notches which together constitute a circle when the blades are in engagement, said block having a guide peg disposed centrally in said channel, said peg having a diameter to closely fit said circle whereby said guide notches surround said peg when the blades are in engagement to effect alignment of said blades, said blade edges having a pair of complementary cutting notches disposed to one side of said guide notches to accomodate a wire, said block having a bore therein perpendicularly disposed relative to said channel and in registration with said cutting notches whereby when said wire is pulled through said bore a stripping action is effected, and means to effect reciprocation of said blades in opposing directions.

4. In an apparatus for stripping plastic bonded insulation or the like from the surface of a wire, a pair of reciprocable blades having complementary cutting edges, a guide block having a channel for supporting said blades in co-planar relation, said blade edges at the center thereof having a pair of complementary guide, semi-circular notches which together constitute a circle when the blades are in engagement, said block having a guide peg disposed centrally in said channel, said peg having a diameter to closely fit said circle whereby said guide notches surround said peg when the blades are in engagement to effect alignment of said blades, said blade edges having a pair of complementary cutting notches disposed to one side of said guide notches to accommodate a wire, said block having a bore therein perpendicularly disposed relative to said channel and in registration with said cutting notches whereby when said wire is pulled through said bore a stripping action is effected.

5. Apparatus for stripping plastic bonded insulation or the like from the surface of a wire comprising a pair of oppositely reciprocable blades having complementary cutting edges, a guide block having a channel for supporting said blades in co-planar relation said blade edges at the center thereof having a pair of semi-circular complementary guide notches which when the blades are in engagement form a circle, said block having a guide peg disposed centrally in said channel, whereby said guide notches surround said peg when the blades are in engagement, said blade edges having a pair of complementary cutting notches disposed to one side of said guide notches to accommodate a wire, said block having a bore therein perpendicularly disposed relative to said channel and in registration with said cutting notches whereby when said wire is pulled through said bore a stripping action is effected, said edges having a second pair of cutting notches to the other side of said guide notches and registrable with said bore by reversal in position of said blades.

6. A wire stripper-mechanism comprising a guide block having a rectangular channel therein, a pair of rectangular blades slideably disposed in co-planar relation in said channel and having complementary cutting edges, a pair of rocker arms pivotally connected to said blades, an electromagnet having a plunger operatively coupled to both of said rocker arms to swing same outwardly when energized, spring means coupled to said blades normally to urge same in the inward direction, said blade edges having a pair of complementary cutting notches formed therein to accommodate a wire, said block having a bore therein perpendicularly disposed relative to said channel and in registration with said notches whereby when said wire is pulled through said bore said blades effect a stripping action.

7. A wire stripper-mechanism comprising a guide block having a rectangular channel therein, a pair of rectangular blades slideably disposed in co-planar relation in said channel and having complementary cutting edges, a pair of rocker arms pivotally connected to said blades, an electromagnet having a plunger operatively coupled to said rocker arms to swing same outwardly when energized, spring means coupled to said blades normally to urge same in the inward direction, said blade edges having a pair of complementary cutting notches formed therein to accommodate a wire, said block having a bore therein perpendicularly disposed relative to said channel and parallel to the sides of said block and in registration with said notches whereby when said wire is pulled through said bore said blades effect a stripping action, said block having a second bore therein at an angle to said sides and opening at a point adjacent said notches to feed a cleaning jet of air to the stripped wire.

8. A wire stripper-mechanism comprising a guide block having a rectangular channel therein, a pair of rectangular blades slideably disposed in co-planar relation in said channel and having complementary cutting edges, a pair of rocker arms pivotally connected to said blades to effect reciprocating movement thereof in opposing directions, an electromagnet having a plunger operatively coupled to said rocker arms to swing same outwardly when energized, flat spring means coupled to said blades to urge same in the inward direction, a guide member fixedly supported in said channel, said blade edges having a pair of guide notches centrally therein to engage said guide member in said channel, said edges further having first and second pairs of complementary cutting notches formed therein on either side of said guide notches to accommodate a wire, said block having a bore therein perpendicularly disposed relative to said channel and in registration with one pair of said cutting notches whereby when said wire is pulled through said bore said blades effect a stripping action.

References Cited in the file of this patent

UNITED STATES PATENTS

| | | |
|---|---|---|
| 1,298,999 | Moltrup | Apr. 1, 1919 |
| 1,930,219 | Zimber | Oct. 10, 1933 |
| 2,307,046 | Johnson | Jan. 5, 1943 |
| 2,671,363 | Wells | Mar. 9, 1954 |
| 2,680,394 | Andren | June 8, 1954 |
| 2,718,021 | Baebel | Sept. 20, 1955 |